(12) United States Patent
Perez et al.

(10) Patent No.: US 6,856,705 B2
(45) Date of Patent: Feb. 15, 2005

(54) IMAGE BLENDING BY GUIDED INTERPOLATION

(75) Inventors: Patrick Perez, Cambridge (GB); Michel Gangnet, Cambridge (GB); Andrew Blake, Stapleford (GB)

(73) Assignee: Microsoft Corporation, Redmond, WA (US)

(*) Notice: Subject to any disclaimer, the term of this patent is extended or adjusted under 35 U.S.C. 154(b) by 53 days.

(21) Appl. No.: 10/417,937

(22) Filed: Apr. 16, 2003

(65) Prior Publication Data

US 2004/0165788 A1 Aug. 26, 2004

Related U.S. Application Data

(60) Provisional application No. 60/450,078, filed on Feb. 25, 2003.

(51) Int. Cl.[7] .................................................. G06T 5/10
(52) U.S. Cl. ........................ 382/264; 382/284; 382/300; 345/592; 345/606; 345/611; 345/629
(58) Field of Search ................................ 382/264, 274, 382/275, 284, 285, 300; 345/592, 629–641, 606, 611, 608, 609

(56) References Cited

U.S. PATENT DOCUMENTS

| | | | | |
|---|---|---|---|---|
| 4,602,286 A | * | 7/1986 | Kellar et al. ................ | 348/597 |
| 5,022,085 A | * | 6/1991 | Cok ............................ | 382/284 |
| 5,870,103 A | * | 2/1999 | Luo ............................ | 345/630 |
| 6,081,615 A | * | 6/2000 | Yasui ......................... | 382/162 |
| 6,094,511 A | * | 7/2000 | Metcalfe et al. ............ | 382/260 |

OTHER PUBLICATIONS

Qian et al., Video Background Replacement without a Blue Screen, IEEE, 1999, pp. 143146.*
Liao et al., A New Framework of Quantifying Differences Between Images by Matching Gradient Fields and its Application of Image Blending, IEEE, 2003, pp. 1092–1096.*
Whitaker, A Level–Ser Approach to Image Blending, IEEE, 2000, pp. 1849–1861.*

\* cited by examiner

Primary Examiner—Brian Werner
(74) Attorney, Agent, or Firm—Microsoft Corporation (57) ABSTRACT

A blended result image is computed using guided interpolation to alter image data within a destination domain. The destination domain may be altered based on a guided interpolator that is either dependent or not dependent upon a source image. When blending a source region into a destination region of an image, guided interpolation eliminates or minimizes apparent seams between the inserted region and the rest of the image. A variety of interpolation guides may be used to yield different effects in the blended results image. Such interpolation guides may include without limitation an identity guide, a smooth guide, a filtering guide, a transparent guide, a masking guide, and a weighted average combination of various guides.

26 Claims, 10 Drawing Sheets

IMAGE BLENDING BY GUIDED INTERPOLATION

RELATED APPLICATIONS

This application claims benefit of U.S. Provisional Patent Application No. 60/450,078 filed on Feb. 25, 2003, entitled "Image Blending By Guided Interpolation", specifically incorporated herein by reference for all that it discloses and teaches.

TECHNICAL FIELD

The invention relates generally to image editing, and more particularly to blending an image.

BACKGROUND

Editing digital images, particularly digital photographs, is a common activity in both domestic and professional contexts. One common task includes pasting a piece of one image into another image or into other locations of the same image. This operation is useful for repairing, correcting, and modifying digital images.

Figure 1:
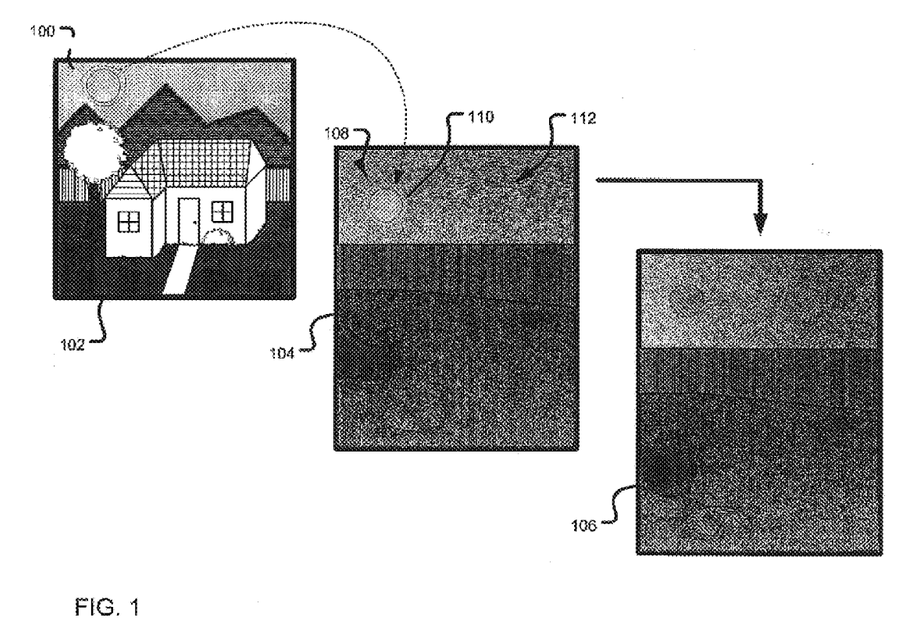
FIG. 1 depicts schematic representations of a source image, a destination image, and a blended result image in an embodiment of the present invention.

For example, in FIG. 1, a user wishes to insert a sun 100 from a source image 102 into a destination image 104. In a simple copy-and-paste operation, the user would select or "clip" around the perimeter of the sun 100 in the source image 102, copy the clipped region, and paste the clipped region at the desired location within the destination image 104. Alternatively, a simple drag-and-drop operation may be employed in a similar manner. However, in both approaches, the boundary (or "seam") between the inserted clipped region and the rest of the destination image 104 would appear abrupt and reflect any irregularities in the clipping operation. Furthermore, any portion of the sun's background (i.e., a solid light blue in a color image) in source image 102 that was captured in the clipping operation would appear as a stark discontinuity when inserted into the destination image 104, in which the sky is represented by a gray hazy background. In other words, the inserted clipping would not blend into the destination image 104.

An alternative approach, called "cloning", involves an anchor point defined within a source image. A paintbrush control is used on the destination image to define the region of the destination image into which the source image data should be copied. The results are similar to the copy-and-paste or drag-n-drop alternatives.

In addition, other image editing operations can also involve altering the appearance of a selected region of an image. For example, texture in a region of an image may be flattened, a background or foreground may be decolonized, or illumination changes may be performed on a region of the image. However, such editing operations also introduce problems with seams between the edited region and the rest of the original image.

To improve the results of these existing approaches, a local "feathering" operation may be performed to conceal the seams between the inserted clipping and the destination image background. Such a feathering approach typically involves blurring or smearing the image data at the seam to approximate a smooth transition between the inserted clipping and the destination image background. However, a feathering operation may produce unsatisfactory results because the seam is merely replaced with blurred image data. Furthermore, the existing approaches fail to provide a variety of blending modes to allow a user to best integrate an inserted image portion into a destination image.

Therefore, the existing clipping and cloning approaches fail to satisfactorily provide flexible and seamless image insertion and editing in many common scenarios.

SUMMARY OF THE INVENTION

Embodiments of the present invention solve the discussed problems by providing a blended result image using guided interpolation to alter image data within a destination domain. The destination domain may be altered based on a guided interpolator that is either dependent or independent upon a source image. A variety of interpolation guides may be used to yield different effects in the blended results image.

In implementations of the present invention, articles of manufacture are provided as computer program products. One embodiment of a computer program product provides a computer program storage medium readable by a computer system and encoding a computer program that computes a blended result image from a destination image. Another embodiment of a computer program product may be provided in a computer data signal embodied in a carrier wave by a computing system and encoding the computer program that computes a blended result image from a destination image.

The computer program product encodes a computer program for executing on a computer system a computer process for computing a blended result image from a destination image. A destination domain having a boundary is defined in the destination image. A guided interpolator, including an interpolation guide and a boundary condition associated with the boundary of the destination domain, is provided. The blended result image is computed based on the guided interpolator to satisfy the boundary condition at the boundary of the destination domain and to minimize a difference across the destination domain between the interpolation guide and a gradient of the blended result image.

In another implementation of the present invention, a method of computing a blended result image from a destination image is provided. A destination domain having a boundary is defined in the destination image. A guided interpolator, including an interpolation guide and a boundary condition associated with the boundary of the destination domain, is provided. The blended result image is computed based on the guided interpolator to satisfy the boundary condition at the boundary of the destination domain and to minimize a difference across the destination domain between the interpolation guide and a gradient of the blended result image.

In yet another embodiment of the present invention, a system for computing a blended result image from a destination image is provided. A domain definition module defines a destination domain having a boundary in the destination image. An interpolation guide datastore provides a guided interpolator including an interpolation guide, and a boundary condition associated with the boundary of the destination domain. A blending computation module computes the blended result image based on the guided interpolator to satisfy the boundary condition at the boundary of the destination domain and to minimize a difference across the destination domain between the interpolation guide and a gradient of the blended result image.

These and various other features as well as other advantages, which characterize the present invention, will be apparent from a reading of the following detailed description and a review of the associated drawings.

DETAILED DESCRIPTION OF THE INVENTION

Embodiments of the present invention provide a blended result image using guided interpolation to alter image data within a destination domain. The destination domain may be altered based on a guided interpolator that is either dependent or independent upon a source image. When blending a source region into a destination region of an image, guided interpolation can eliminate or minimize apparent seams between the inserted region and the rest of the image. Furthermore, a variety of interpolation guides may be used to yield different effects in the blended results image. Such interpolation guides may include without limitation an identity guide, a smooth guide, a filter guide, a transparent guide, a masking guide, and a weighted average combination of various guides.

FIG. 1 depicts a source image, a destination image, and a blended result image in an embodiment of the present invention. The source image 102 includes a source region 100 containing a sun. A user wishes to insert and blend the source region 100 into the destination image 104, which does not initially include the inserted sun at location 108. In a first operation, the user defines the source region 100, such as by dragging an outline around the source region 100. Alternative methods of defining the source region 100 may be employed, including without limitation setting in anchor point for a cloning brush, selecting an element in the image, specifying a color characteristic of a source region, or specifying coordinates in the source image 102.

Generally, digital image data is represented by pixel values. For example, a black and white digital image may be represented by a vector of pixel intensity values, each vector element corresponding to an individual pixel. In contrast, a digital image data for a color image may be represented with multiple values for each pixel. For example, in the RGB (red, green, blue) color space, each pixel is presented by intensity values for each of three color channels. Other color spaces are also contemplated, including without limitation LC1C2 and CIE-lab space.

It should be understood that to merely copy-and-paste the source region 100 into the destination image 104 would typically result in an irregular blue-sky-colored border or seam 110 around the sun, overlaying the darker night sky background 112 of the destination image 104. A seam typically appears as an abrupt change in color, brightness, features, texture, etc. as compared to the destination image. As such, to produce a more realistic result image, blending of the inserted source region 104 can obscure or eliminate the visibility of the seam 110 in the result image 106. Accordingly, as shown in the result image 106, the source region 100 has been inserted and blended into the destination image 104 to produce a realistic effect.

Figure 2:
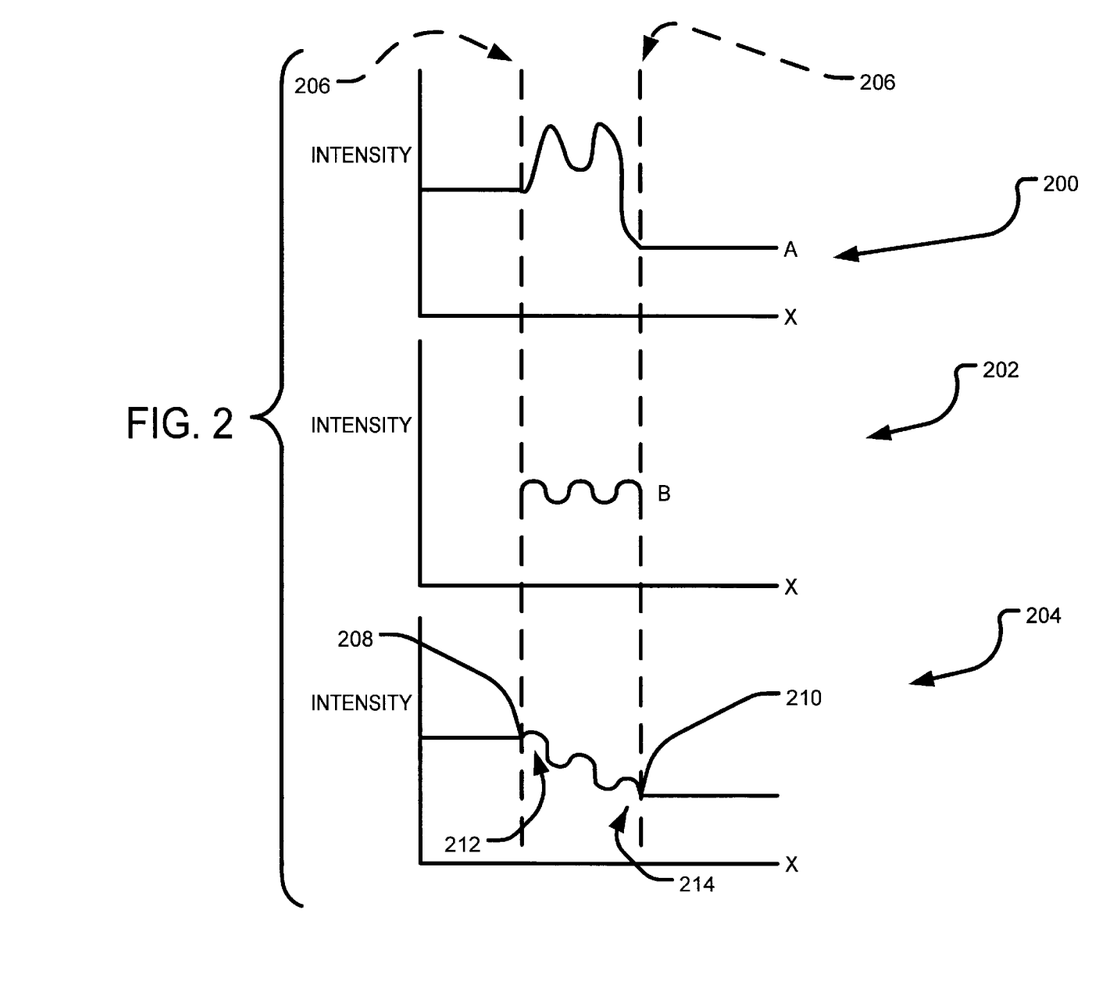
FIG. 2 depicts a conceptual blending of two one-dimensional functions in an embodiment of the present invention.

FIG. 2 depicts a conceptual blending of two one-dimensional functions in an embodiment of the present invention. This description regarding FIG. 2 provides a conceptual demonstration of a blending operation involving one-dimensional "images". It should be understood, however, that various types of blending operations are contemplated within the scope of the present invention, including without limitation the two-dimensional blending operations described with regard to other figures herein.

A first intensity function A is shown in destination graph 200, representing a one-dimensional destination "image". A second intensity function B is shown in a source graph 202, representing a one-dimensional source "image" that is to be inserted into the destination image of graph 200. The blended result function is shown in a result graph 204, representing a one-dimensional blended result "image".

Dashed lines 206 represent boundaries of the source region and the destination region. In another embodiment of the present invention, the source and destination regions may have disparate sizes and shapes (e.g., rectangular, circular, irregular), both of which may be altered by the system to be more compatible for blending.

In one embodiment of the present invention, a user wished to use the blending operation to merge the source region into the destination region, such that the image data at the boundary of the destination region is blended to appear realistic. In the illustrated embodiment, this is shown conceptually by connecting source region of the first intensity function A to the boundary points of the second intensity function B. As such, the blended result function illustrates a combination of the two intensity functions. In order to eliminate, minimize, or otherwise reduce the appearance of seams, the boundary conditions of the component functions are blended such that the values of each component functions are equal as the functions approach the boundary points 208 and 210.

Figure 3:
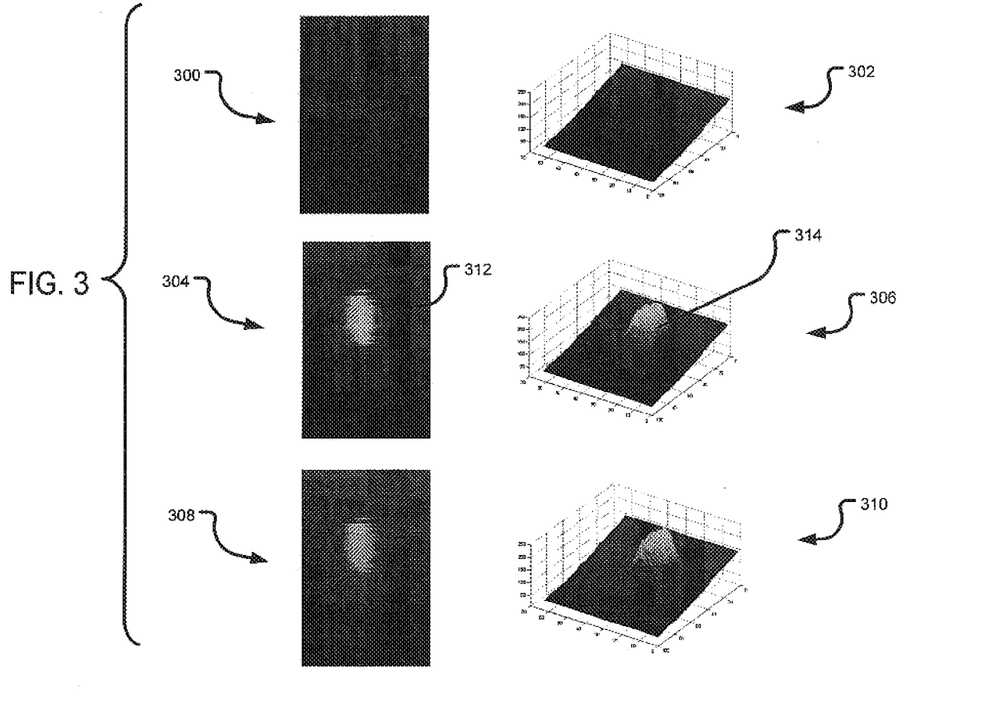
FIG. 3 illustrates a blending of two two-dimensional image regions in an embodiment of the present invention.

FIG. 3 illustrates a blending of two two-dimensional image regions in an embodiment of the present invention. To extend the conceptual description of the one-dimensional blending of FIG. 2, an example of two-dimensional blending is provided in FIG. 3. A destination image 300 shows a dark water surface. The corresponding intensity data associated with the destination image 300 is shown in the two-dimensional intensity graph 302, where intensity may include a mono-color intensity (such as white in a black-and-white image or a single color channel in a color image) or some other appearance signal (e.g., a component or aggregate value of LC1C2, etc.). For example, note that as the destination image 300 becomes lighter near the top, the intensity of white shown in the intensity graph 302 increases. In an intermediate image 304, a source region 312, which contains a reflection of the sun on a different water surface, has been inserted into the image. In the illustrated embodiment, the destination region is defined as the region of the image overlapped by the source region 312. Prior to blending, the seams between the source region and the rest of the destination image are very apparent, as shown in the intermediate image 304, at least in part because of the difference in the color of the water. This can also be seen in the non-blended intensity graph 306, in which the intensity data relating to the source region 312 is abruptly visible at 314.

In the blended result image 308, the source region has been blended into the destination region to provide a realistic image of a reflection of the sun on the water surface. Changes in the intensity of the image data in the source region are apparent in the blended result intensity graph 310, where the intensity data of inserted source region has been blended to match the intensity data of the destination image at the boundary of this first region, thereby decreasing the overall "brightness" of the source region.

Figure 4:
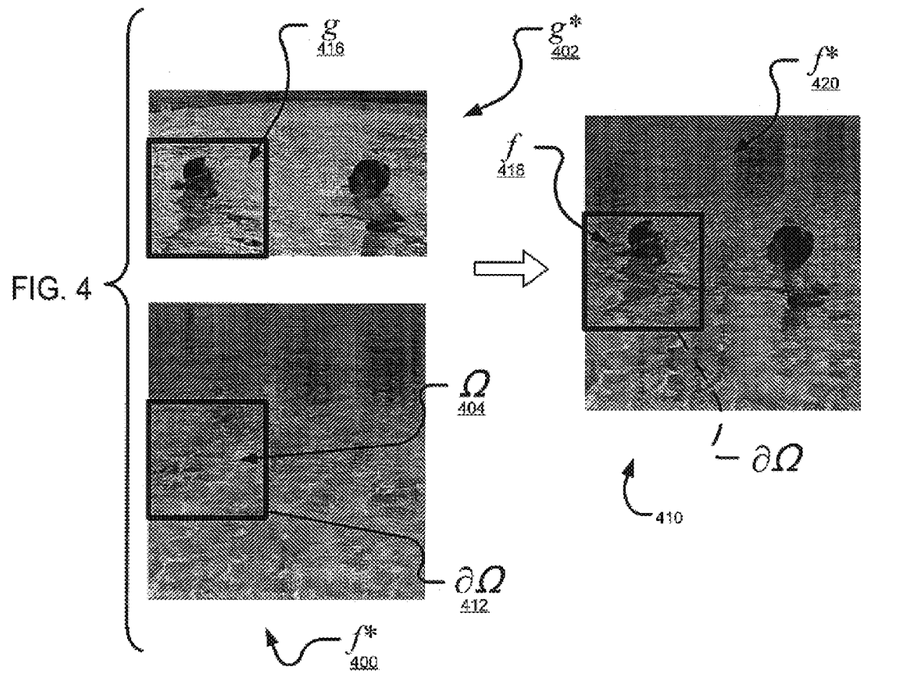
FIG. 4 depicts a source image, a destination image, and a result image in an embodiment of the present invention.

FIG. 4 depicts a source image, a destination image, and a blended result image in an embodiment of the present invention. A destination image 400 shows (in a color image) the light green surface of the ocean at a beach. A source image 402 shows (in a color image) two children in a swimming pool, in which the water appears light blue. For the purpose of this discussion and to map image features to the algorithms described herein, the destination image 400 is referred to as "$f^*$", and the destination region 404 in the destination image 400 is referred to as "$\Omega$". The boundary 412 of the destination region 404 is referred to as "$\partial\Omega$". Likewise, the source image 402 is referred to as "$g^*$", and the image data of the source region 416 is referred to as "$g$", and. In the blended result image 410, the source region 416 has been blended into the destination region 404 to produce the composite result image comprising image regions 418 and 420 (the blended image data $f$ within $\Omega$, and the remaining portion of $f^*$, i.e., the portion of the destination image outside of the destination region). Note: The blended result image was generated by inserting source regions containing each child into the destination image sequentially.

In one embodiment of the present invention, the blending operation is implemented using the following functional minimization as a guided interpolator (or "minimizer"):

$$\min_f \iint_\Omega |\nabla f - \nabla g|^2,$$

having the boundary condition $f|_{\partial\Omega}=f^*|_{\partial\Omega}$, where $$\nabla . = \left[\frac{\partial .}{\partial x}, \frac{\partial .}{\partial y}\right]$$

is the gradient operator. In addition, other interpolators may be employed, such maximization functions and functions that optimize to a given goal, threshold, or range.

The associated Euler-Lagrange equation, i.e., the condition met by the guided interpolator, is known as the Poisson equation with Dirichlet boundary conditions:

$$\Delta f = \Delta g \text{ over } \Omega \text{ with } f|_{\partial\Omega}=f^*|_{\partial\Omega},$$

where $$\Delta . = \left[\frac{\partial .^2}{\partial x^2}, \frac{\partial .^2}{\partial y^2}\right]$$

is the Laplacian operator.

The guided interpolation approach may be more generally represented by the following functional minimization as the guided interpolator:

$$\min_f \iint_\Omega |\nabla f - v|^2,$$

having the boundary condition $f|_{\partial\Omega}=f^*|_{\partial\Omega}$, where v represents an interpolation guide and $f$ is referred to as an "interpolant". Calculus indicates that the functional minimization is the unique solution of Poisson equation:

$$\Delta f = \text{div } v \text{ over } \Omega \text{ with } f|_{\partial\Omega}=f^*|_{\partial\Omega},$$

where div $$v = \frac{\partial u}{\partial x} + \frac{\partial v}{\partial y}$$

is the divergence of v=[u, v].

Various choices of v permit blending if a variety of ways, as shown in the table of example interpolation guides below, although other interpolation guides are contemplated within the scope of the present invention.

| Interpolation Guide Name | Symbol | Interpolation Guide Definition |
| --- | --- | --- |
| Identity | I | $v = \nabla f^*$ |
| Smooth | S | $v = 0$ |
| Filtering | F | $v = F(\nabla g)$ |
| Transparent | T | $v = 1_{[|\nabla f^*|>|\nabla g|]}\nabla f^* + 1_{[|\nabla g|>|\nabla f^*|]}\nabla g$ |
| Masking | M | $v = 1_{[|\nabla f|>\tau]}\nabla f$ |
| Weighted Average Combination | W | $v = \alpha I + (1 - \alpha)F$ (for example) |

For example, the identity interpolation guide I results in no change to the destination image (thus, $f=f^*$). Alternatively, the smooth interpolation guide S alters the destination image. The associated Euler-Lagrange equation for the smooth interpolation guide S is:

$$\Delta f = 0$$

over $\Omega$ with $f|_{\partial\Omega}=f^*|_{\partial\Omega}$ and is known as the Laplace equation with Dirichlet boundary conditions. The unique solution $f$ of the Laplace equation with Dirichlet boundary conditions is often referred to as the "membrane interpolant". Solving a discretized version of this problem in each color channel leads to a very smoothed or blurred image region in the domain $\Omega$. The Smooth interpolation guide S minimizes the gradient inside the domain ("null guidance"), and results in a very smooth interpolation of the colors lying on the border of the domain. The Smooth interpolation guide S can be used by computer graphics region filling algorithms, including polygon and arbitrary shape filling algorithms.

Figure 7:
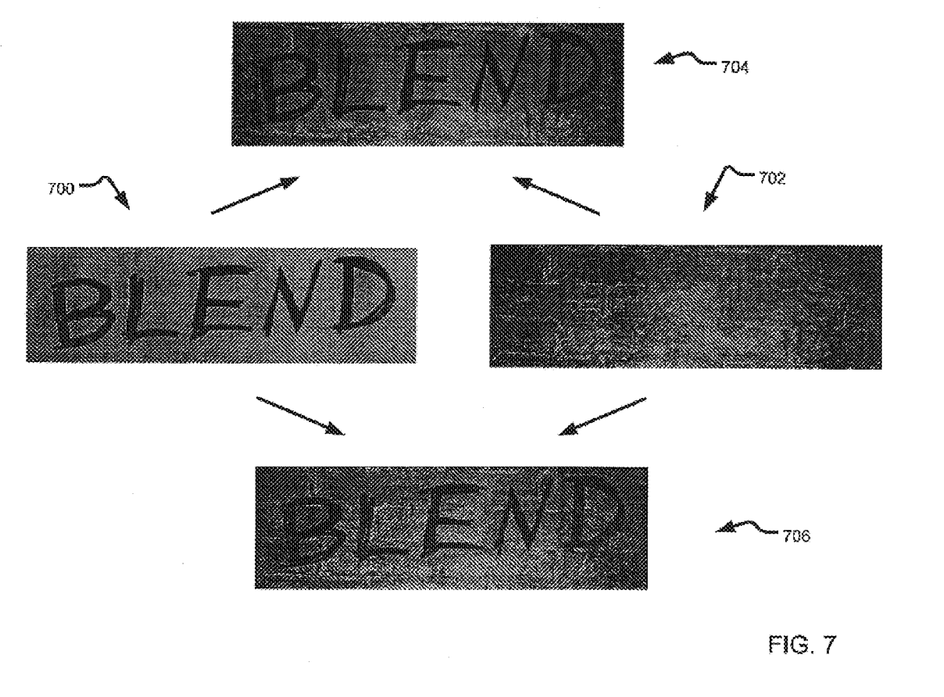
FIG. 7 depicts blended results derived from a transparent interpolation guide in an embodiment of the present invention.
Figure 8:
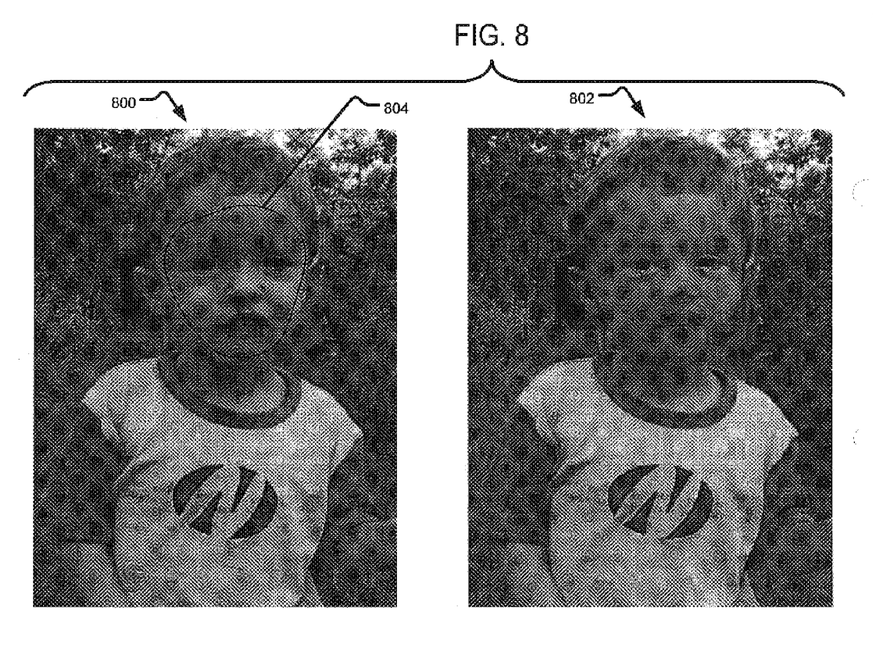
FIG. 8 depicts a blended result derived from a masking interpolation guide in an embodiment of the present invention.

Exemplary effects of the transparent and masking interpolation guides are shown and discussed with regard to FIGS. 7 and 8, respectively.

Figure 5:
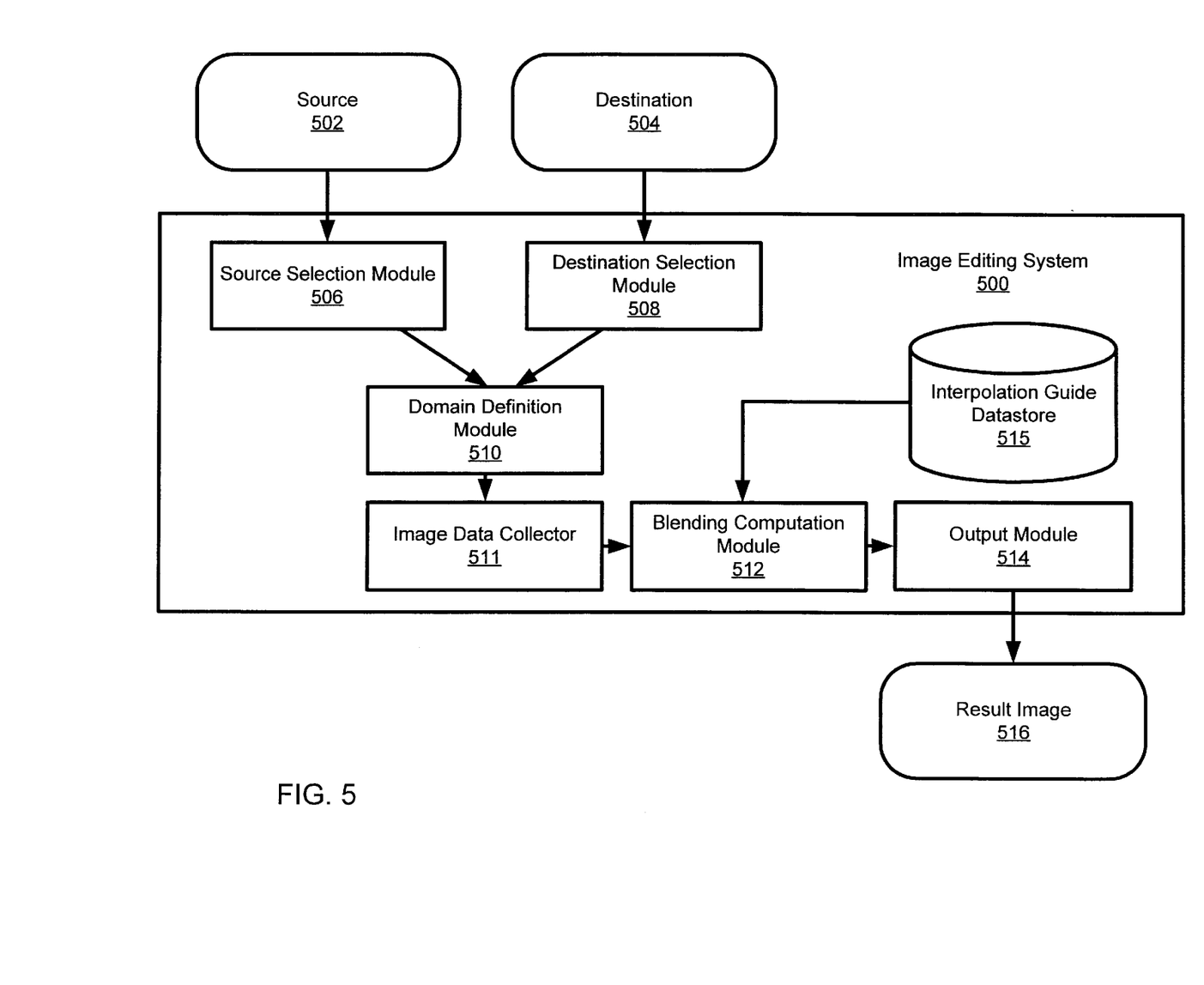
FIG. 5 depicts a blending system in an embodiment of the present invention.

FIG. 5 depicts a blending system in an embodiment present invention. An image editing system 500 receives a destination 504, such as image data for a destination image. A destination selection module 508 receives the selection of a destination region within the destination 504. As previously discussed, the destination region may be defined by a pasting operation, a cloning operation, an outlining operation, or other methods of selecting a region of the destination image.

In at least one embodiment, the image editing system 500 also receives a source 502, such as a source image. A source selection module 506 receives the selection of a source region within the source 504. It should be understood, however, that alternative embodiments, such as those involving a smooth interpolation guide or a masking interpolation guide, do not require a source or a source selection module because the interpolation guide is independent of any source.

A domain definition module 510 receives the selection or selections and defines a destination domain (and possibly, a source domain). In one embodiment, a domain definition may be in the form of ranges of X and Y coordinates on an image, although other means of defining a domain are contemplated within the scope of the present invention, including without limitation arrays of image locations and region-defining algorithms.

An image data collector 511 collects the image data contained within the destination image, the destination domain, and possibly the source domain, in the input image (s), which have been represented herein by the functions, $f^*$, $f^*$ over $\Omega$, and g, respectively. A blending computation module 512 receives the destination domain definition, the destination image data, and possibly the source region information. In addition, the blended computation module 512 uses these input to compute image data for a blended result image 516 based on an interpolation guide, derived or accessed from information stored in the interpolation guide datastore 515. The image data for the blended result image 516 is received by the output module 514, which can render the blended result image 516 on a display or output the image to a storage device or another application.

Figure 6:
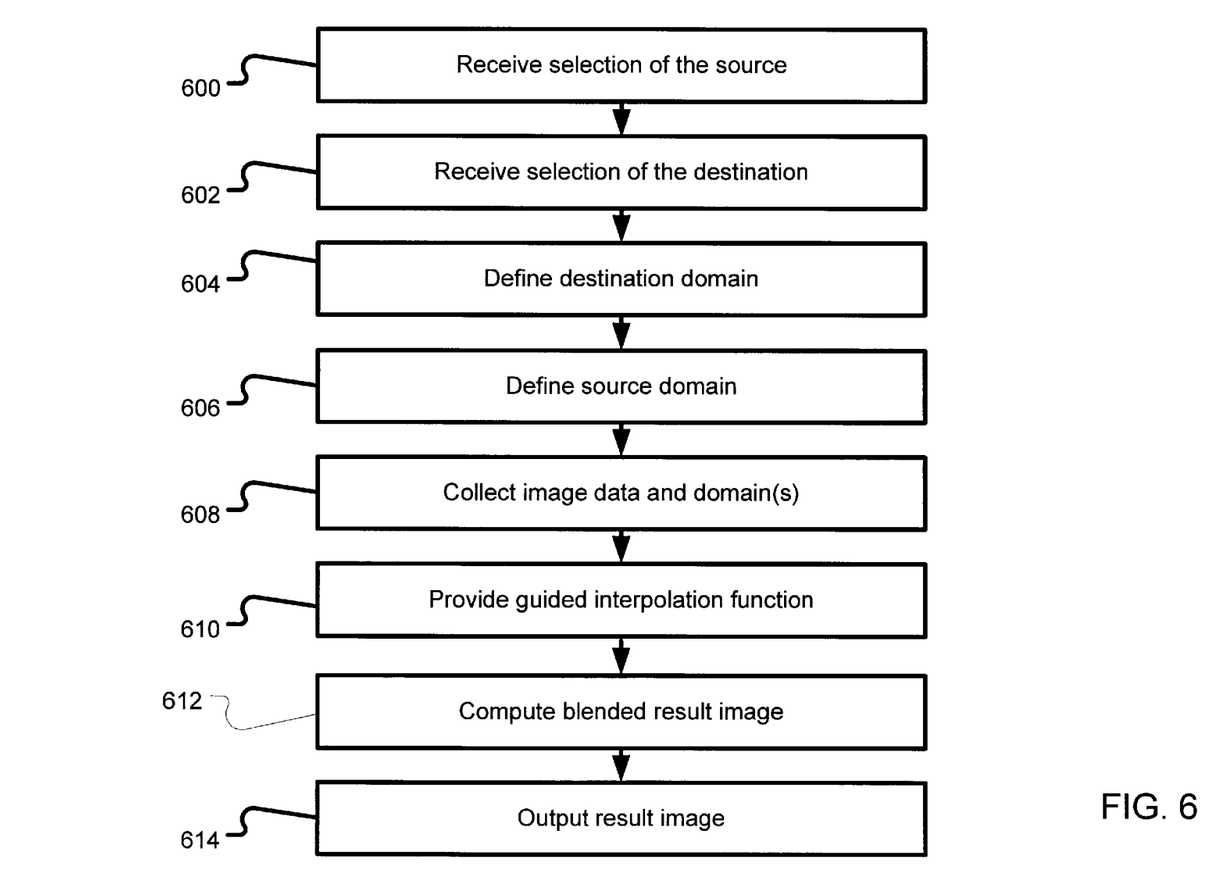
FIG. 6 depicts operations for blending in an embodiment of the present invention.

FIG. 6 depicts operations for blending in an embodiment of the present invention. A receiving operation 600 receives a selection from a source (e.g., a source region). Another receiving operation 602 receives a selection of a destination (e.g., a destination region). A defining operation 604 defines a source domain based on the selection from the source. Another defining operation 606 defines a destination domain based on the selection from the destination.

A collecting operation 608 collects the image data contained within the destination image, the destination domain, and possibly the source domain, which have been represented herein by the functions $f^*$, $f^*$ over $\Omega$, and g, respectively. A providing operation 610 provides a guided interpolator, such as by accessing a datastore or providing a hard coded algorithm. A computing operation 612 computes a blended result image from the collected image data and the guided interpolator. An output operation outputs the blended result image to a display or other output device.

FIG. 7 depicts blended results derived from a Transparent interpolation guide in an embodiment of the present invention. A source image 700 is blended into a destination image 702 using the Filtering interpolation guide F to produce a blended result image 704. However, it is clear from the result image 704 that the space between and within the letters of the word "BLEND" are not realistically rendered. In contrast, a second interpolation guide, called Transparent, is applied to produce a blended result image 706. The algorithm for Transparent is given in the table above.

An alternative representation of the Transparent algorithm is:

$$v = \begin{cases} \nabla f^*(x) & \text{if } |\nabla f^*(x)| > |g(x)| \\ \nabla g(x) & \text{otherwise} \end{cases}$$

The Transparent interpolation guide T, at each location in the destination region, selects the image gradient (either from source image data or from destination image data) that is the greatest. In this manner, the blended result image comprises image data that best matches the most apparent features of either the source region or the destination region in a given location in the destination domain.

FIG. 8 depicts a blended result derived from a Masking interpolation guide M in an embodiment of the present invention. In a Masking interpolation guide, the gradient if optimized to satisfy a predetermined criterion, including without limitation being below a threshold, above a threshold, within a given range, and meeting a given goal.

As shown above, the Masking interpolation guide M filters the destination image data such that only the most salient features are generated in the destination region of the blended result image. For example, using the Masking interpolation guide M shown in the previous table, image data intensity in a source region 804 of a source image 800 is attenuated for low (or, alternatively, high) gradient regions to produce a cartoon-like effect, shown in blended result image 802.

Alternatively, the Masking interpolation guide M may be modified to provide a band filter range:

$$v = \begin{cases} \nabla g(x) & \text{if } \tau_2 > |\nabla g(x)| > \tau_1 \\ 0 & \text{otherwise} \end{cases}$$

Figure 9:
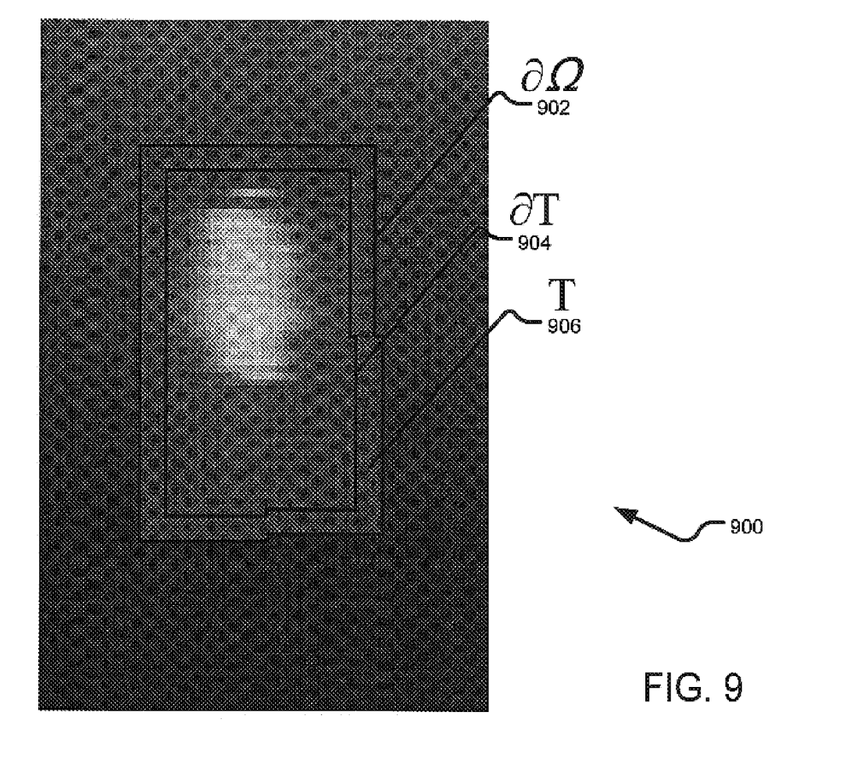
FIG. 9 illustrates blending into the destination image in an embodiment of the present invention.

FIG. 9 illustrates blending into the destination image outside the dimensions of the source domain in an embodiment of the present invention. A destination image 900 is shown with a destination region bounded by a destination boundary $\partial \Omega$ 902. A blending region T 906 is bounded by a blending boundary $\partial T$ 904 on the inside and the destination boundary $\partial \Omega$ 902 on the outside. A guided interpolator may be provided to perform some amount of mixing in the region T between destination boundary $\partial \Omega$ 902 and blending boundary $\partial T$ 904:

$$\min_f \int\int_\Omega |\nabla f - v|^2 + \alpha \int\int_T |f - f^*|^2,$$

having the boundary condition $f|_{\partial \Omega} = f^*|_{\partial \Omega}$. The magnitude of the mixing effect in this region may be controlled by the weighting parameter $\alpha$.

Figure 10:
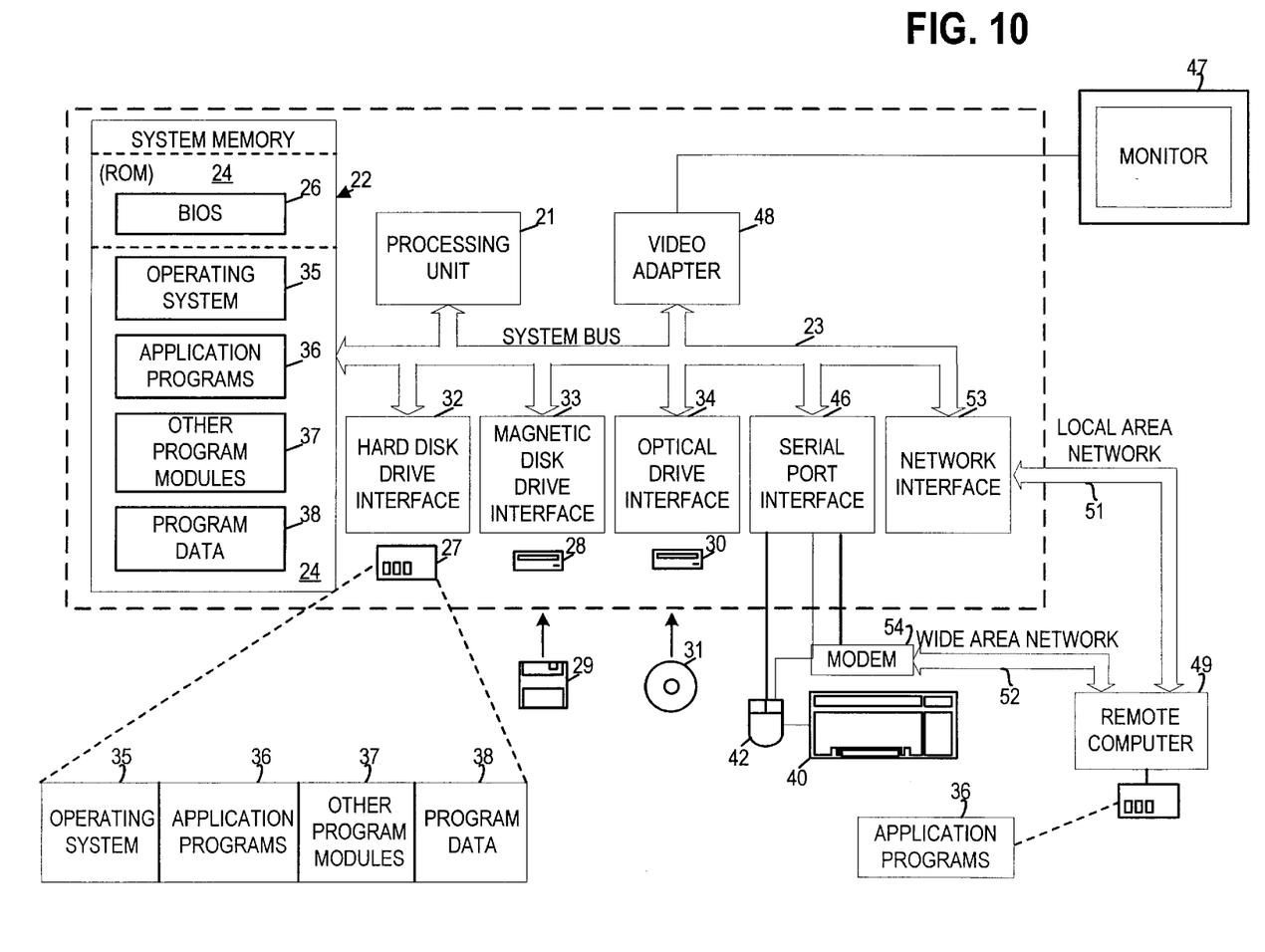
FIG. 10 illustrates an exemplary system useful for implementing an embodiment of the present invention.

The exemplary hardware and operating environment of FIG. 10 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, the selection modules, a domain definition module, a blending computation module, and an output module may be incorporated as part of the operating system 35, application programs 36, or other program modules 37. The interpolation guide datastore and image data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of computing a blended result image from a destination image, the method comprising:

defining a destination domain having a boundary in the destination image, providing a guided interpolator including an interpolation guide and a boundary condition associated with the boundary of the destination domain; and computing the blended result image based on the guided interpolator to satisfy the boundary condition at the boundary of the destination domain and to minimize a difference across the destination domain between the interpolation guide and a gradient of the blended result image.

2. The method of claim 1 wherein the providing operation comprises:

providing a masking interpolation guide as the interpolation guide, the masking interpolation guide including a gradient of the destination image within the destination domain where the gradient of the destination image satisfies a predetermined criterion.

3. The method of claim 1 wherein at least a portion of a source image is blended into the destination image to generate the blended result image, the interpolation guide being a function of the source image.

4. The method of claim 1 wherein at least a portion of a source image is blended into the destination image to generate the blended result image and further comprising:

defining a source domain having a boundary in the source image.

5. The method of claim 4 wherein the providing operation comprises:

providing a filtering interpolation guide as the interpolation guide, the filtering interpolation guide including a gradient of the source image within the source domain.

6. The method of claim 4 wherein the providing operation comprises:

providing a transparent interpolation guide as the interpolation guide, the transparent interpolation guide including a greater of a gradient of the source image within the source domain and a gradient of the destination image within the destination domain.

7. The method of claim 1 wherein the boundary condition requires each value of image data in the blended result image at the boundary of the destination domain to equal each corresponding value of image data in the destination image at the boundary.

8. The method of claim 1 wherein the guided interpolator is represented by a functional minimization $$\min_f \iint_\Omega |\nabla f - v|^2,$$

having the boundary condition $f|_{\partial\Omega} = f^*|_{\partial\Omega}$, where v represents an interpolation guide, $f$ represents the blended result image within the destination domain, and $f^*$ represents the blended result image outside the destination domain.

9. A computer program product encoding a computer program for executing on a computer system a computer process for computing a blended result image from a destination image, the computer process comprising:

defining a destination domain having a boundary in the destination image, providing a guided interpolator including an interpolation guide and a boundary condition associated with the boundary of the destination domain; and computing the blended result image based on the guided interpolator to satisfy the boundary condition at the boundary of the destination domain and to minimize a difference across the destination domain between the interpolation guide and a gradient of the blended result image.

10. The computer program product of claim 9 wherein the providing operation comprises:

providing a masking interpolation guide as the interpolation guide, the masking interpolation guide including a gradient of the destination image within the destination domain where the gradient of the destination image satisfies a predetermined criterion.

11. The computer program product of claim 9 wherein at least a portion of a source image is blended into the destination image to generate the blended result image, the interpolation guide being a function of the source image.

12. The computer program product of claim 9, wherein at least a portion of a source image is blended into the destination image to generate the blended result image, further comprising:

defining a source domain having a boundary in the source image.

13. The computer program product of claim 12 wherein the providing operation comprises:

providing a filtering interpolation guide as the interpolation guide, the filtering interpolation guide including a gradient of the source image within the source domain.

14. The computer program product of claim 12 wherein the providing operation comprises:

providing a transparent interpolation guide as the interpolation guide, the transparent interpolation guide including a greater of a gradient of the source image within the source domain and a gradient of the destination image within the destination domain.

15. The computer program product of claim 9 wherein the boundary condition requires each value of image data in the blended result image at the boundary of the destination domain to equal each corresponding value of image data in the destination image at the boundary.

16. The computer program product of claim 9 wherein the guided interpolator is represented by a functional minimization $$\min_f \iint_\Omega |\nabla f - v|^2,$$

having the boundary condition $f|_{\partial\Omega} = f^*|_{\partial\Omega}$, where v represents an interpolation guide, $f$ represents the blended result image within the destination domain, and $f^*$ represents the blended result image outside the destination domain.

17. A system for computing a blended result image from a destination image, the system comprising:

a domain definition module defining a destination domain having a boundary in the destination image, an interpolation guide datastore storing a guided interpolator including an interpolation guide and a boundary condition associated with the boundary of the destination domain; and a blending computation module computing the blended result image based on the guided interpolator to satisfy the boundary condition at the boundary of the destination domain and to minimize a difference across the destination domain between the interpolation guide and a gradient of the blended result image.

18. The system of claim 17 wherein the interpolation guide includes a gradient of the destination image within the destination region.

19. The system of claim 17 wherein the interpolation guide equals zero.

20. The system of claim 17 wherein the interpolation guide includes a gradient of the destination image within the destination domain where the gradient of the destination image satisfies a predetermined criterion.

21. The system of claim 17 wherein at least a portion of a source image is blended into the destination image to generate the blended result image, the interpolation guide being a function of the source image.

22. The system of claim 17, wherein at least a portion of a source image is blended into the destination image to generate the blended result image, further comprising:

defining a source domain having a boundary in the source image.

23. The system of claim 22 wherein the interpolation guide includes a gradient of the source image within the source domain.

24. The system of claim 22 wherein the interpolation guide includes a greater of a gradient of the source image within the source domain and a gradient of the destination image within the destination domain.

25. The system of claim 17 wherein the boundary condition requires each value of image data in the blended result image at the boundary of the destination domain to equal each corresponding value of image data in the destination image at the boundary.

26. The system of claim 17 wherein the guided interpolator is represented by a functional minimization $$\min_f \iint_\Omega |\nabla f - v|^2,$$

having the boundary condition $f|_{\partial\Omega} = f^*|_{\partial\Omega}$, where v represents an interpolation guide, $f$ represents the blended result image within the destination domain, and $f^*$ represents the blended result image outside the destination domain.

* * * * *